United States Patent
Kuo (10) Patent No.: US 8,246,231 B2
(45) Date of Patent: Aug. 21, 2012

(54) BACKLIGHT MODULE

(75) Inventor: Hao-Jan Kuo, Hsinchu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 356 days.

(21) Appl. No.: 12/588,595

(22) Filed: Oct. 21, 2009

(65) Prior Publication Data

US 2010/0110726 A1    May 6, 2010

(30) Foreign Application Priority Data

Nov. 3, 2008 (TW) ................................ 97219641 U (51) Int. Cl.
*F21V 7/04* (2006.01)

(52) U.S. Cl. .................. 362/607; 362/246; 362/331

(58) Field of Classification Search .............. 362/246, 362/330, 339, 606, 607, 618, 619, 620, 627; 359/599

See application file for complete search history.

(56) References Cited

U.S. PATENT DOCUMENTS

| | | | |
|---|---|---|---|
| 5,126,882 A | 6/1992 | Oe et al. | |
| 6,275,338 B1 * | 8/2001 | Arai et al. | 359/599 |
| 6,502,947 B2 | 1/2003 | Matsumoto et al. | |
| 6,874,902 B2 | 4/2005 | Yamashita et al. | |
| 7,153,017 B2 | 12/2006 | Yamashita et al. | |
| 7,967,492 B2 * | 6/2011 | Nagasawa et al. | 362/618 |
| 2007/0064294 A1 | 3/2007 | Hoshino et al. | |
| 2009/0147179 A1 * | 6/2009 | Yamashita et al. | 362/339 |

FOREIGN PATENT DOCUMENTS

| | | |
|---|---|---|
| TW | I282445 | 6/2007 |
| TW | 200813488 | 3/2008 |

* cited by examiner

*Primary Examiner* — Y My Quach Lee
(74) *Attorney, Agent, or Firm* — Bacon & Thomas, PLLC (57) ABSTRACT

A backlight module includes at least one light emitting element capable of emitting a light beam and a light diffusion brightness enhancement film. The brightness enhancement film includes a light transmissive substrate, a plurality of prism rods, and at least one light diffusion structure. The light transmissive substrate has a first and a second surfaces opposite to each other. The first and the second surfaces are disposed in a transmission path of the light beam. The first surface is disposed between the light emitting element and the second surface. Each of the prism rod extends along a first direction. The prism rods are disposed on the first surface and are arranged along a second direction. The light diffusion structure is disposed on the first surface and between the two adjacent prism rods, and has a rough surface. The light diffusion structure and the rough surface extend along the first direction.

10 Claims, 7 Drawing Sheets

BACKLIGHT MODULE

CROSS-REFERENCE TO RELATED APPLICATION

This application claims the priority benefit of Taiwan application serial no. 97219641, filed on Nov. 3, 2008. The entirety of the above-mentioned patent application is hereby incorporated by reference herein and made a part of this specification.

BACKGROUND OF THE INVENTION (1) Field of the Invention

The invention relates to a light source module, and more particularly to a backlight module.

(2) Description of the Related Art

Figure 1:
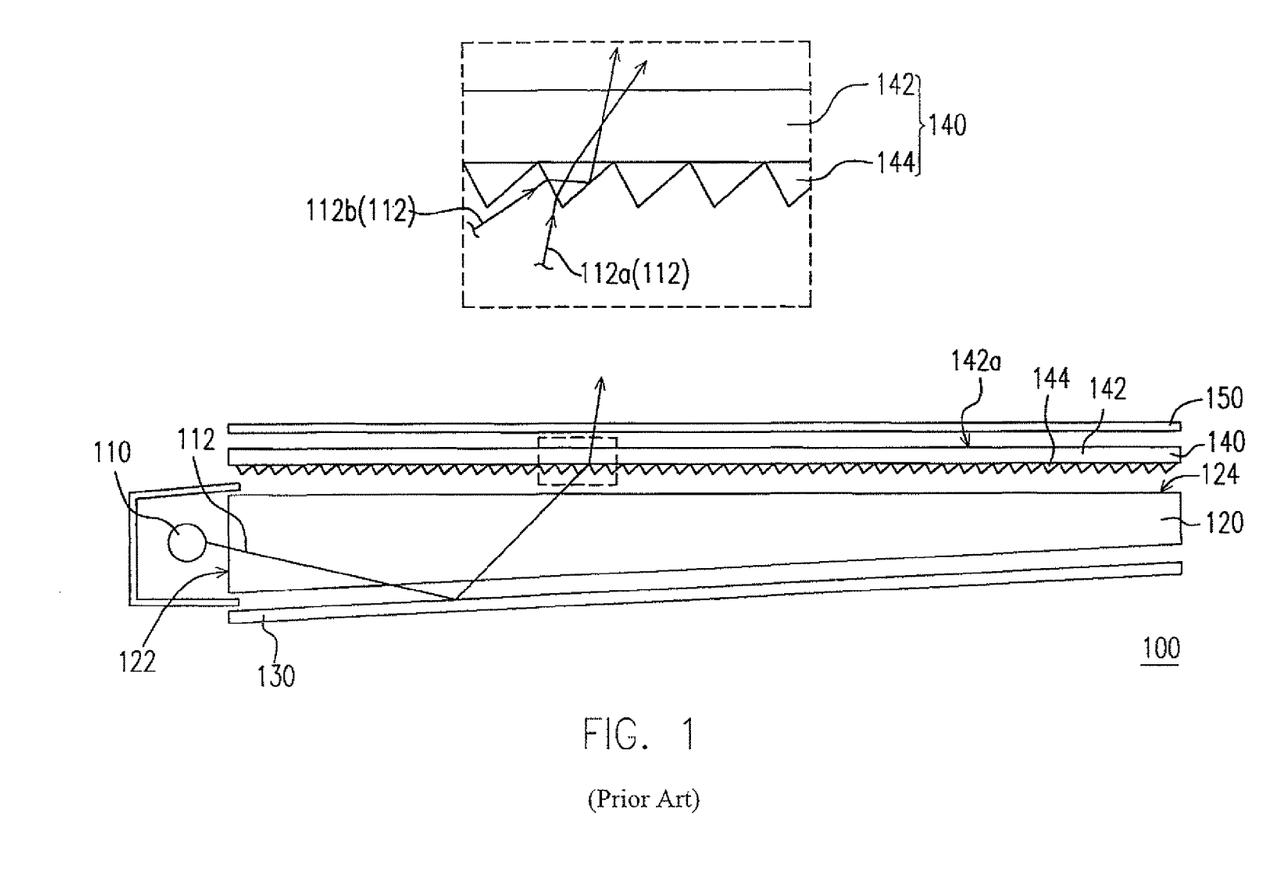
FIG. 1 is a schematic view showing a conventional backlight module.

FIG. 1 is a schematic view showing the structure of a conventional backlight module 100. As shown in FIG. 1, the conventional backlight module 100 includes a cold cathode fluorescent lamp (CCFL) 110, a light guide plate 120, a reflection sheet 130, a reverse prism sheet 140, and a diffusion sheet 150. The CCFL 110 is capable of emitting a light beam 112. The light beam 112 enters into the light guide plate 120 through a light incident surface 122 of the light guide plate 120, and is reflected to a light emitting surface 124 of the light guide plate 120 by the reflection sheet 130. The light beam 112 emits outside of the light guide plate 120 through the light emitting surface 124 and transmits to the reverse prism sheet 140.

The reverse prism sheet 140 is composed of a light transmissive substrate 142 and a plurality of reverse prism rods 144. Generally, the light beam 112 (e.g. partial light beam 112b) emitted from the light emitting surface 124 of the light guide plate 120 at an angle in a range between 65 degrees and 75 degrees emits towards the light transmissive substrate 142 through the reverse prism sheet 140, and then exits by a light emitting surface 142a of the light transmissive substrate 142 at an angle in a range between −20 degrees and 20 degrees for emitting to the diffusion sheet 150 to form a plane light source with a small light emitting angle. In addition, the light beam 112 (e.g. partial light beam 112a) emitted from the light emitting surface 124 of the light guide plate 120 at an angle out of a range between 65 degrees and 75 degrees may exit by the light emitting surface 142a of the light transmissive substrate 140 at an angle out of a range between −20 degrees and 20 degrees, and the light beam 112 (e.g. partial light beam 112a) may not be used.

Figure 2:
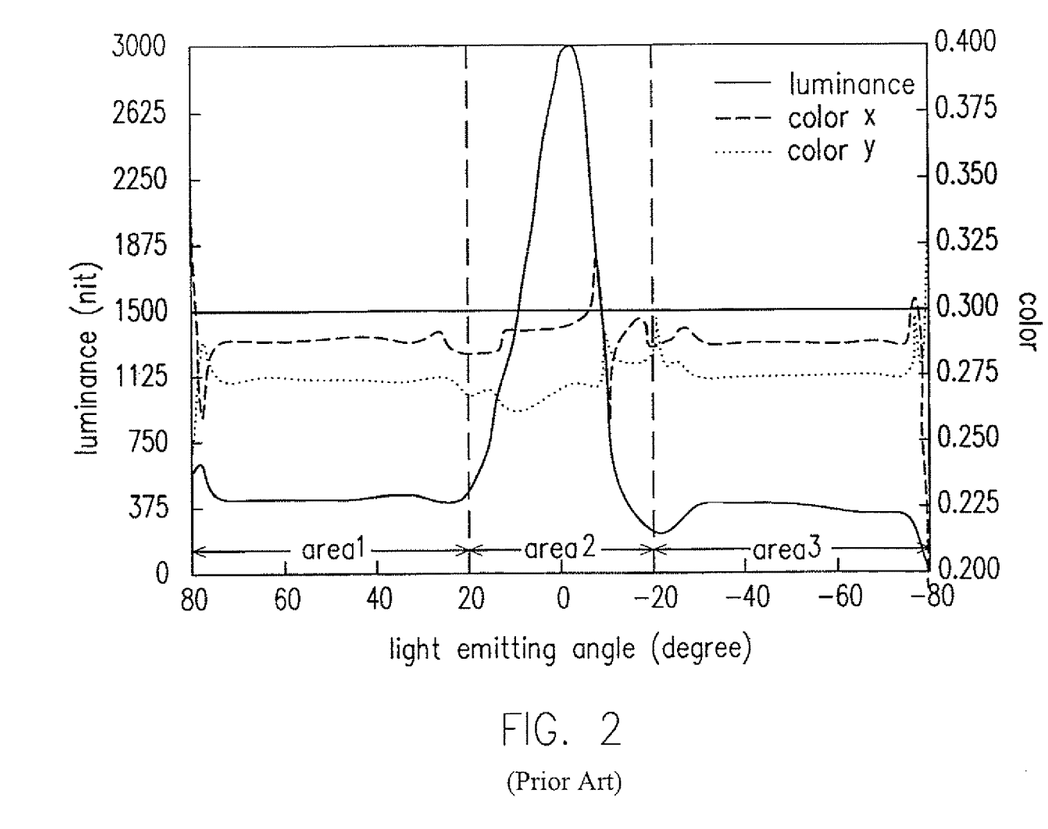
FIG. 2 is a distribution diagram of brightness to light emitting angle of a reverse prism sheet according to FIG. 1.

FIG. 2 is a distribution diagram of brightness to light emitting angle of the reverse prism sheet according to FIG. 1. As shown in FIG. 2, 63% of the light beam 112 (the light beam 112 in a area 2 shown in the diagram) transmits through the reverse prism sheet 140 and exits in a approximately perpendicular emitting angle (in a range between −20 degrees and 20 degrees) to form a plane light source, and 37% of the light beam 112 (the light beam 112 in a area 1 and a area 3 shown in the diagram) may not be used so that the light efficiency of the backlight module 100 is hard to be increased.

Referring to FIG. 1, in order to prevent the shape of the reverse prism rods 144 from being seen by viewers and avoid the moiré or the Newton rings when the liquid crystal plate is arranged on the backlight module 100, the diffusion sheet 150 is arranged on the reverse prism sheet 140 to blur the shape of the reverse prism 144. At the same time, the diffusion sheet 150 may also cause the light loss and decrease the efficiency of the backlight module 100.

SUMMARY

The invention provides a backlight module with a uniform brightness plane light source.

A backlight module is provided in an embodiment of the invention. The backlight module includes at least one light emitting element and a light diffusion brightness enhancement film. The light emitting element is capable of emitting a light beam. The light diffusion brightness enhancement film includes a light transmissive substrate, a plurality of prism rods, and at least one light diffusion structure. The light transmissive substrate has a first surface and a second surface opposite to the first surface. The first surface and the second surface are disposed in a transmission path of the light beam, and the first surface is disposed between the light emitting element and the second surface. The prism rods are disposed on the first surface. Each of the prism rods extends along a first direction, and the prism rods are arranged along a second direction. The light diffusion structure is disposed on the first surface and between the two adjacent prism rods. The light diffusion structure has a rough surface facing away from the light transmissive substrate. The light diffusion structure and the rough surface extend along the first direction.

In one embodiment of the invention, the first direction is substantially perpendicular to the second direction. The ratio of the width of the rough surface in the second direction to the pitch of the prism rods along the second direction falls in a range between 3% and 50%. Each of the prism rods has a first column surface and a second column surface. The first column surface is disposed at one side of the light transmissive substrate and extends along the first direction, and the second column surface is disposed at the side of the light transmissive substrate and extends along the first direction, and an end of the second column surface is connected with an end of the first column surface.

In one embodiment of the invention, the first column surface has a first normal vector, the first surface has a third normal vector, a second angle is formed between the first normal vector and the third normal vector, and the second angle falls in a range between 60 degrees and 80 degrees. The second column surface has a second normal vector, a first angle is formed between the second normal vector and the third normal vector, and the first angle falls in a range between 40 degrees and 60 degrees. A third angle is formed between the first normal vector and the second normal vector, and the third angle falls in a range between 110 degrees and 130 degrees.

In one embodiment of the invention, the first angle is substantially equal to the second angle. A boundary of the first and the second column surfaces of each of the prism rods is a crest line extending along the first direction. The pitch of the prism rods along the second direction falls in a range between 30 micron and 150 micron.

A backlight module is provided in another embodiment of the invention. The backlight module includes at least one light emitting element and a light diffusion brightness enhancement film. The light emitting element is capable of emitting a light beam. The light diffusion brightness enhancement film includes a light transmissive substrate, a light diffusion film, and a plurality of prism rods. The light transmissive substrate has a first surface and a second surface opposite to the first surface. The first surface and the second surface are disposed in a transmission path of the light beam, and the first surface is disposed between the light emitting element and the second surface. The light diffusion film is disposed on the first surface and has a rough surface facing away from the light transmissive substrate. The prism rods are disposed on the rough surface, each of the prism rods extends along a first direction, and the prism rods are arranged along a second direction.

In one embodiment of the invention, the two adjacent prism rods have a interval along the second direction, and the ratio of the interval to the pitch of the prism rods along the second direction falls in a range between 3% and 50%. Each of the prism rods has a first column surface and a second column surface. The first column surface is disposed at one side of the rough surface and extends along the first direction, and the second column surface is disposed at the side of the rough surface and extends along the first direction, and an end of the second column surface is connected with an end of the first column surface.

In the embodiments of the invention, the light diffusion brightness enhancement film of the backlight module has a plurality of prism rods. Moreover, the light diffusion brightness enhancement film includes light diffusion structures or light diffusion film. The light diffusion phenomenon generated by the light diffusion structures or the light diffusion film may blur the shape of the prism rods, and consequently it decreases the moiré or the Newton rings. Therefore, the drawbacks of the prism rods may not be discovered and the manufacture yield of the backlight module is increased. Besides, since the light diffusion structures or the light diffusion film and the prism rods are disposed at the same side of the light transmissive substrate, the prism rods and the light diffusion structure (or the light diffusion film) may be formed in the method of single side coating.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In this specification, the definition of a normal vector of a surface of an object is a vector perpendicular to the surface and directed from the inside of the object to the outside of the object.

Figure 3A:
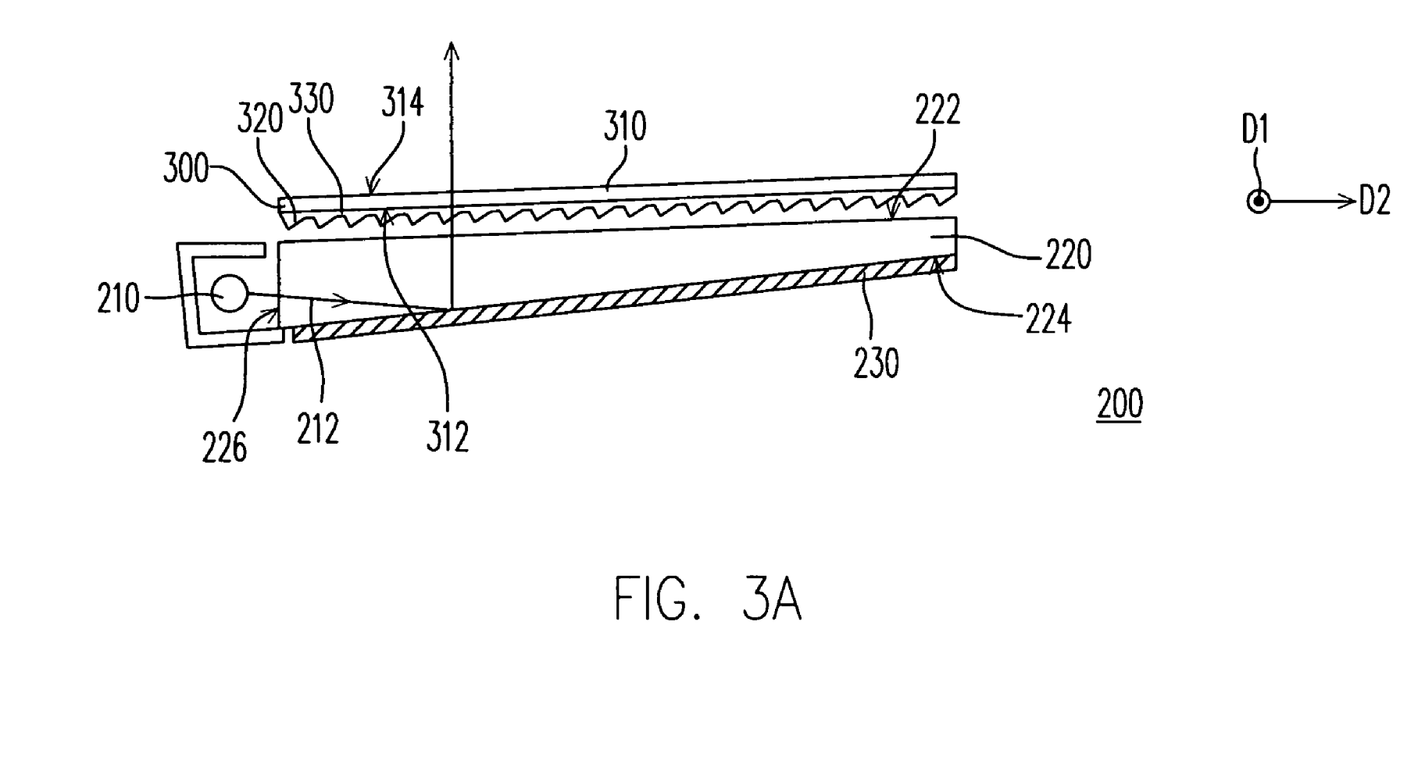
FIG. 3A is a schematic view showing a backlight module in accordance with an embodiment of the invention.
Figure 3B:
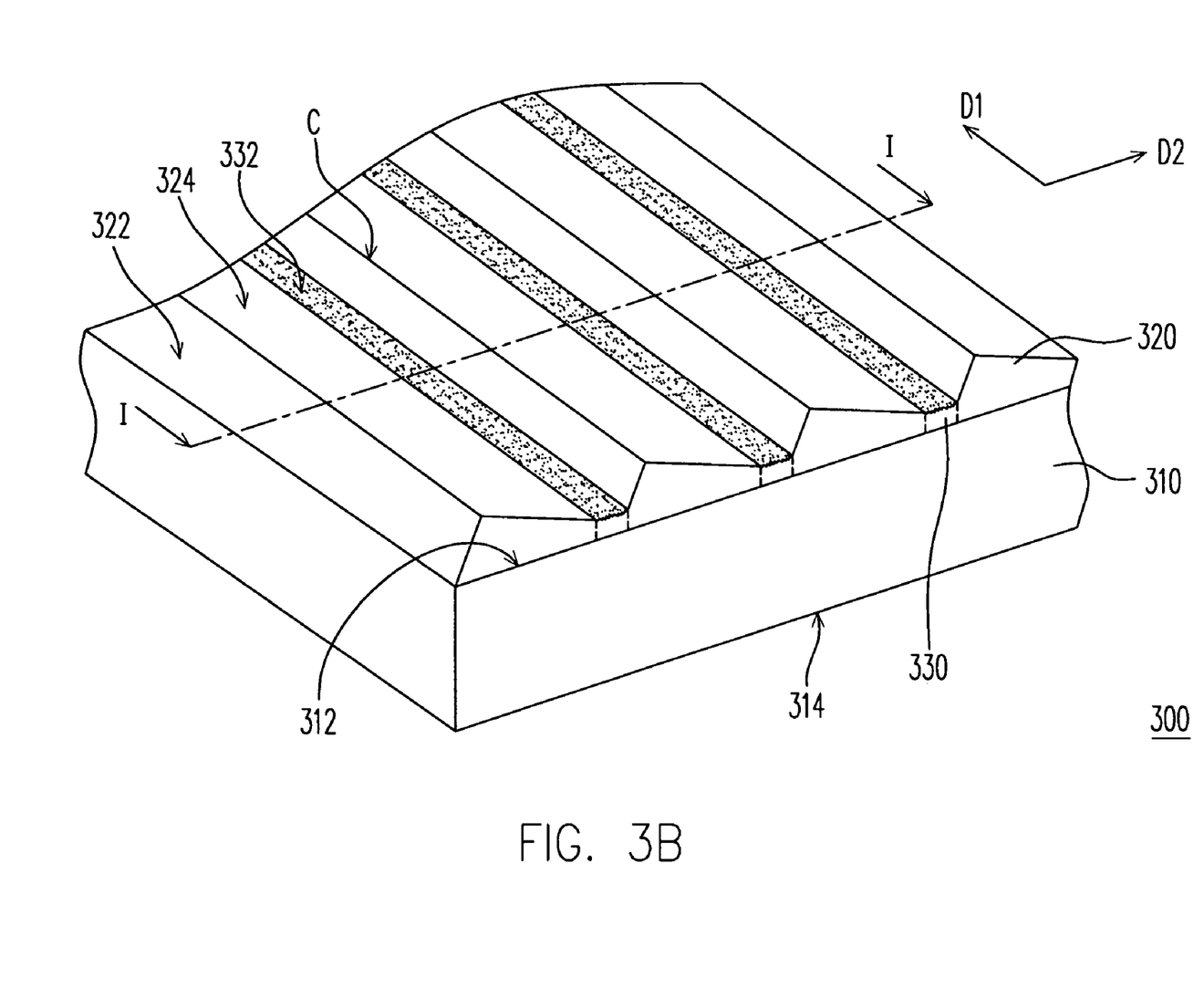
FIG. 3B is a partial three-dimensional view showing a light diffusion brightness enhancement film of FIG. 3A.
Figure 3C:
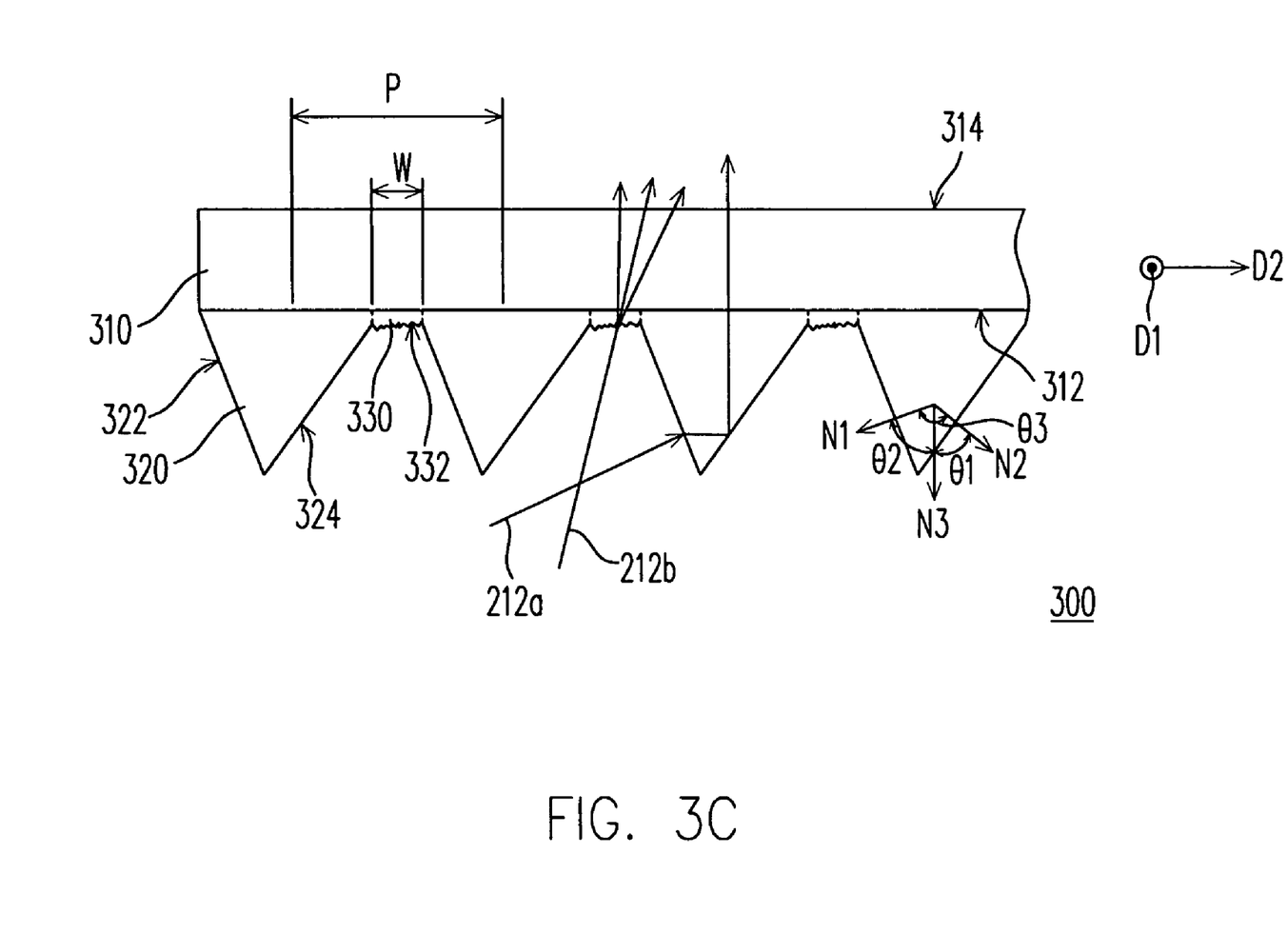
FIG. 3C is a partial cross-section view of the light diffusion brightness enhancement film along the I-I line in FIG. 3B.

Referring to the FIGS. 3A to 3C, a backlight module 200 of one embodiment of the invention includes a light emitting element 210 and a light diffusion brightness enhancement film 300. The light emitting element 210 is capable of emitting a light beam 212. In the embodiment, the light emitting element 210 may be a cold cathode fluorescent lamp, however, the cold cathode fluorescent lamp may be replaced by a plurality of light emitting diodes (LEDs) or other suitable light emitting elements in other embodiments of the invention. The light diffusion brightness enhancement film 300 is disposed in a transmission path of the light beam 212. In this embodiment, the backlight module 200 further includes a light guide plate 220. The light guide plate 220 is disposed in the transmission path of the light beam 212 and between the light emitting element 210 and the light diffusion brightness enhancement film 300. The light guide plate 220 further has a third surface 222, a fourth surface 224 opposite to the third surface 222, and a light incident surface 226 connected with the third surface 222 and the fourth surface 224. The light beam 212 emitted by the light emitting element 210 enters the light guide plate 220 through the light incident surface 226, and the light beam 212 exits out of the light guide plate 220 through the third surface 222. In this embodiment, a reflection sheet 230 may be disposed on one side of the fourth surface 224 and is capable of reflecting the light beam 212 from the light incident surface 226 to the third surface 222.

The light diffusion brightness enhancement film 300 includes a light transmissive substrate 310, a plurality of prism rods 320, and a plurality of light diffusion structure 330. The light transmissive substrate 310 has a first surface 312 and a second surface 314 opposite to the first surface 312. The first surface 312 and the second surface 314 are both in the transmission path of the light beam 212, and the first surface 312 is disposed between the light emitting element 210 and the second surface 314. The prism rods 320 are disposed on the first surface 312. Each of the prism rods 320 extends along a first direction D1 and the prism rods 320 are arranged along a second direction D2. In this embodiment, the first direction D1 is substantially perpendicular to the second direction D2. Furthermore, in the embodiment, each of the prism rods 320 has a first column surface 322 and a second column surface 324. The first column surface 322 is disposed at one side of the light transmissive substrate 310 and extends along the first direction D1, and the second column surface 324 is disposed at the same side of the light transmissive substrate 310 and extends along the first direction D1, and an end of the second column surface 324 is connected with an end of the first column surface 322. Specifically, the boundary of the first column surface 322 and the second column surface 324 of each of the prism rods 320 is, for example, a crest line C extending along the first direction D1.

The first column surface 322 has a first normal vector N1, the second column surface 324 has a second normal vector N2, and the first surface 312 of the light transmissive substrate 310 has a third normal vector N3. A third angle $\theta_3$ is formed between the first normal vector N1 and the second normal vector N2, a first angle $\theta_1$ is formed between the second normal vector N2 and the third normal vector N3, and a second angle $\theta_2$ is formed between the first normal vector N1 and the third normal vector N3. In this embodiment, the second angle $\theta_2$ falls in a range between 60 degrees and 80 degrees, the first angle $\theta_1$ falls in a range between 40 degrees and 60 degrees, and the third angle $\theta_3$ falls in a range between 110 degrees and 130 degrees. In this embodiment, the cross section plane of the prism rod 320 perpendicular to the first direction D1 may be a scalene triangle. However, in other embodiments, the first angle $\theta_1$ may be equal to the second angle $\theta_2$, in other words, the cross section plane of the prism rod 320 perpendicular to the first direction may be an isosceles triangle and the third angle falls in a range between 110 degrees and 130 degrees.

The light diffusion structure 330 is disposed on the first surface 312 and between the two adjacent prism rods 320. The light diffusion structure 330 has a rough surface 332 facing away from the light transmissive substrate 310, and the light diffusion structure 330 and the rough surface 332 extend along the first direction D1.

In the backlight module 200 of the embodiment of the invention, a partial light beam 212a of the light beam 212 (emitted from the third surface 222 of the light guide plate 220 at an angle in a range between 65 degrees and 75 degrees) may pass through the first column surface 322, be reflected by the second 324, and pass through the first surface 312 and the second surface 314 sequentially. In other words, the partial light beam 212a may not pass through the diffusion structure 330, so the partial light beam 212a may not be wasted, and thus increase the utilization rate of the partial light beam 212a. Besides, after the partial light beam 212a passing through the light transmissive substrate 310, the partial light beam 212a is approximately perpendicular to the second surface 314. Therefore the partial light beam 212a is used as the main part of the light beam 212. Consequently, increasing the utilization rate of the partial light beam 212a is increasing the utilization rate of the main part of the light beam 212, that is, increasing the entire light efficiency of the backlight module 220.

On the other side, a partial light beam 212b of the light beam 212 (emitted from the third surface 222 of the light guide plate 220 at an angle out of the range between 65 degrees and 75 degrees) may pass through the light diffusion structure 330, and be scattered by the rough surface 332. When a user views the backlight module 200, the light scattering phenomenon may blur the shape of the prism rods 320, and consequently it may decrease the moiré or the Newton rings when the liquid crystal plate is disposed on the backlight module 200. Furthermore the drawbacks of the prism rods 320 may not be viewed by the user easily, and those described above may increase the manufacture yield of the backlight module 200. In this case, the partial light beam 212b of the light beam 212 emitted from the third surface 222 of the light guide plate 220 at an angle out of the range between 65 degrees and 75 degrees may not be wasted as the prior art, and the light beam 212b is also used to achieve the above-mentioned effects.

The smaller the ratio of the width W of the rough surface 332 in the second direction D2 to the pitch P of the prism rods 320 along the second direction is, the higher the entire light efficiency of the backlight module 200 is, and the easier the shape of the prism rods 320, the drawbacks, even the moiré, and the Newton rings may be seen by the user. However, the larger the ratio of the width W of the rough surface 332 in the second direction D2 to the pitch P of the prism rods 320 along the second direction is, the lower the entire light efficiency of the backlight module 200 is, and the harder the shape of the prism rods 320, the drawbacks, the moiré, and the Newton rings may be seen by the user. In the embodiment, the ratio of the width W to the pitch P may be in the range between 3% and 50% and the pitch P may fall in a range between 30 micrometers and 150 micrometers to make the backlight module 200 have a better optical characteristic.

Furthermore, in this embodiment, the prism rods 320 and the light diffusion structure 330 are integrally formed, and the light transmissive substrate is molded separately with the prism rods 320 and the light diffusion structure 330. In this case, the prism rods 320 and the light diffusion structure 330 may be formed on the light transmissive substrate 310 by single side coating. Compared to the prior art of disposing the prism rods and the light diffusion film on two opposite sides of the light transmissive substrate separately, this processing of the prism rods 320 and the light diffusion structure 330 being formed simultaneously by single side coating may lower down the processing difficulty and the manufacture cost. In other embodiments, the prism rods 320, the light diffusion structure 330, and the light transmissive substrate 310 may be integrally formed.

The embodiments of the invention do not limit the number of the light diffusion structure 330 of the backlight module 200 or the quantity ratio of the prism rods 320 to the light diffusion structure 330. In other embodiments, the backlight module may have one light diffusion structure, or the quantity ratio of the prism rods 320 to the light diffusion structure 330 is different to the quantity ratio shown as FIG. 3C.

Figure 4:
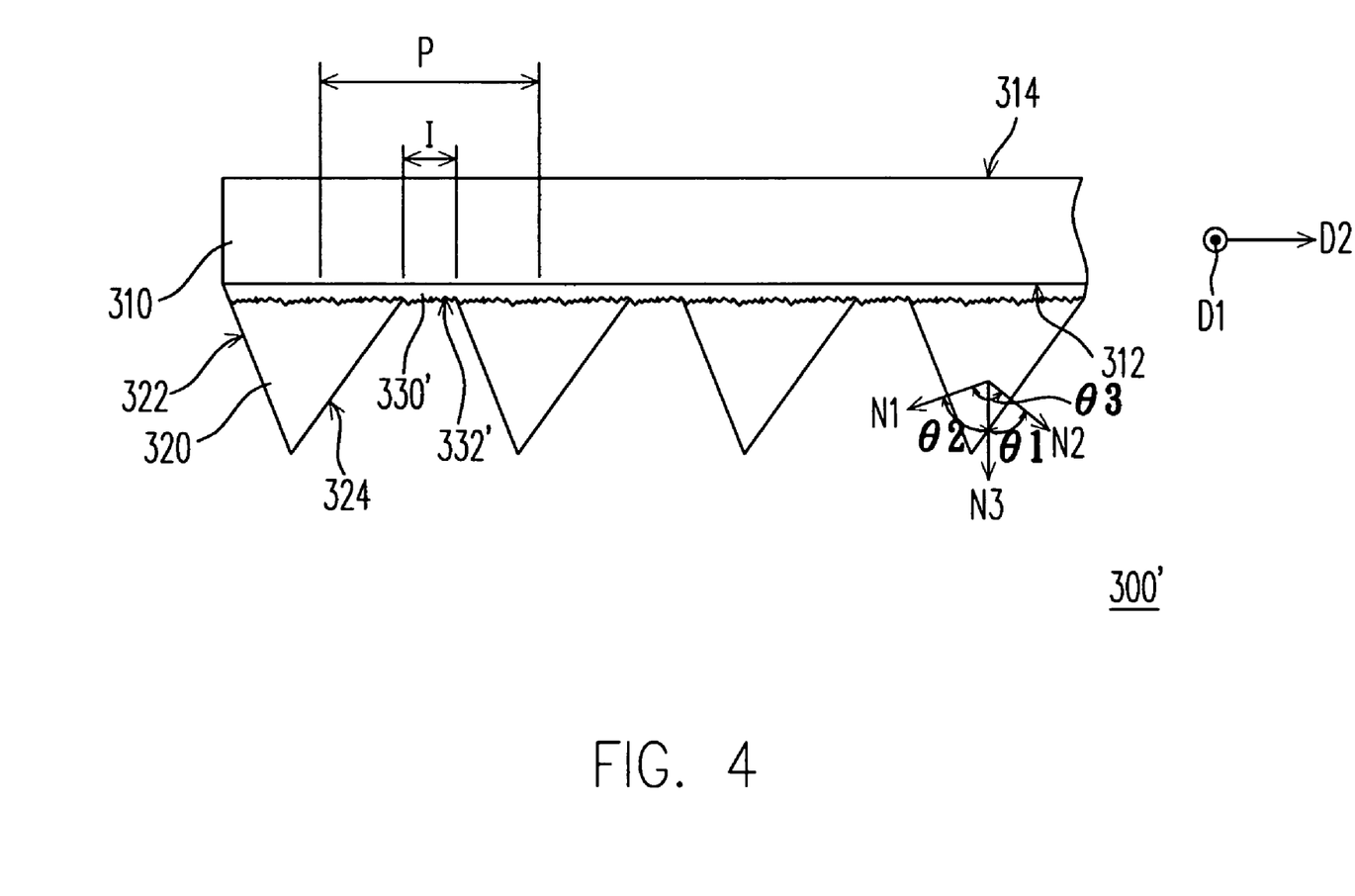
FIG. 4 is a partial cross-section view of a light diffusion brightness enhancement film of a backlight module in accordance with another embodiment of the invention.

Referring to FIG. 4, the backlight module of this embodiment is similar to the backlight module 200 (as shown in FIG. 3A). The differences between the backlight module and the backlight module 200 are described as below. In this embodiment, a light diffusion film 330' of a light diffusion brightness enhancement film 300' is used to replace the light diffusion structure 330 of the light diffusion brightness enhancement film 300 (as shown in FIG. 3C). The light diffusion film 330' is disposed on the first surface 312, and has a rough surface 332' facing away from the light transmissive substrate 310. The prism rods 320 are disposed on the rough surface 332', that is, the first column surfaces 322 and the second column surfaces 324 of the prism rods 320 are disposed at the same side of the rough surface 332'. In this embodiment, the two adjacent prism rods 320 along the second direction D2 have an interval I, and the ratio of the interval I to the pitch P of the prism rods 320 along the second direction D2 is from 3% to 50%. The light diffusion brightness enhancement film 300' and the light diffusion brightness enhancement film 300 (as shown in FIG. 3C) have similar effects and features, and it is not repeated.

Figure 5:
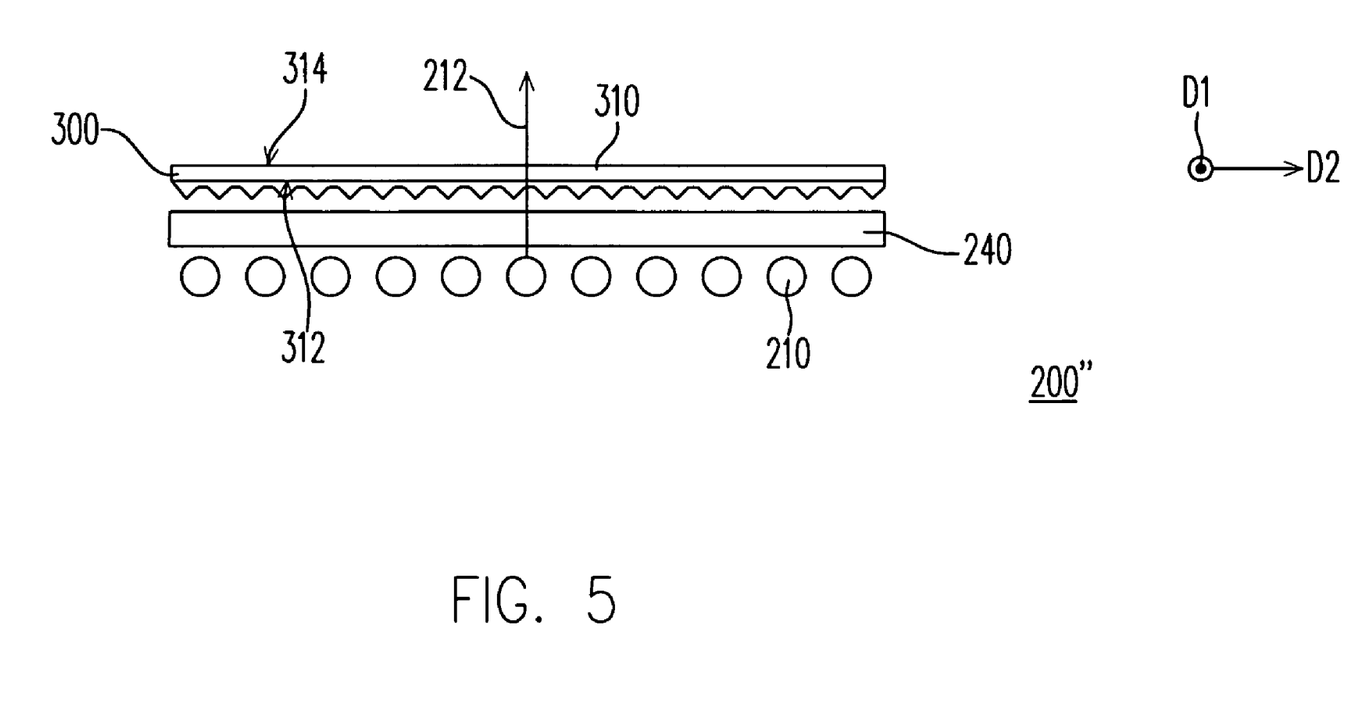
FIG. 5 is a schematic view showing a backlight module in accordance with another embodiment of the invention.

Referring to FIG. 5, a backlight module 200" of this embodiment is similar to the backlight module 200 (as shown in FIG. 3A). The differences between the backlight module 200" and the backlight module 200 are described as below. In the backlight module 200", a diffusion plate 240 is used to replace the light guide plate 220, and the diffusion plate 240 is disposed between the light diffusion brightness enhancement film 300 and the plurality of light emitting elements 210. In other words, the backlight module 200" is a direct backlight module. The backlight module 200" and the backlight module 200 (as shown in FIG. 3A) have similar effects and features, and it is not repeated.

The light diffusion brightness enhancement film 300 of the backlight module 200" may be replaced by the light diffusion brightness enhancement films in other embodiments (e.g. the light diffusion brightness enhancement film 300' in FIG. 4) to form another backlight module.

As described above, in the embodiments of the invention, the light diffusion brightness enhancement film of the backlight module has a plurality of prism rods. Moreover, the light diffusion brightness enhancement film also includes light diffusion structures or the light diffusion film. The light diffusion phenomenon generated by the light diffusion structures or the light diffusion film may blur the shape of the prism rods, and consequently it decreases the moiré or the Newton rings. Therefore, the drawbacks of the prism rods may not be discovered and the manufacture yield of the backlight module is increased. Besides, since the light diffusion structures or light diffusion film and the prism rods are disposed at the same side of the light transmissive substrate and the light diffusion structure is disposed between the two adjacent prism rods, the light beam passing through the prism rods may not be scattered by passing through the light diffusion structure, and the light efficiency of the backlight module is increased.

In addition, because the light diffusion structures or the light diffusion film and the prism rods are disposed at the same side of the light transmissive substrate, the prism rods and the light diffusion structure (or the light diffusion film) may be formed in the method of single side coating. The processing of single side coating may lower down the processing difficulty and the manufacture cost.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   at least one light emitting element, capable of emitting a light beam; and
   a light diffusion brightness enhancement film, comprising:
      a light transmissive substrate, having a first surface and a second surface opposite to the first surface, wherein the first surface and the second surface are disposed in a transmission path of the light beam emitting from the light emitting element, and the first surface is disposed between the light emitting element and the second surface;
      a light diffusion film, disposed on the first surface and having a rough surface facing away from the light transmissive substrate; and
      a plurality of prism rods, disposed on the rough surface, wherein each of the prism rods extends along a first direction and the prism rods are arranged along a second direction.

2. The backlight module according to claim 1, wherein the first direction is substantially perpendicular to the second direction.

3. The backlight module according to claim 1, wherein the two adjacent prism rods have an interval along the second direction, and the ratio of the interval to the pitch of the prism rods along the second direction falls in a range between 3% and 50%.

4. The backlight module according to claim 1, wherein each of the prism rods has:
   a first column surface, disposed at one side of the rough surface and extending along the first direction; and
   a second column surface, disposed at the side of the rough surface and extending along the first direction, wherein an end of the second column surface is connected with an end of the first column surface.

5. The backlight module according to claim 4, wherein the first column surface has a first normal vector, the first surface has a third normal vector, a second angle is formed between the first normal vector and the third normal vector, and the second angle falls in a range between 60 degrees and 80 degrees.

6. The backlight module according to claim 4, wherein the second column surface has a second normal vector, the first surface has a third normal vector, a first angle is formed between the second normal vector and the third normal vector, and the first angle falls in a range between 40 degrees and 60 degrees.

7. The backlight module according to claim 4, wherein the first column surface has a first normal vector, the second column surface has a second normal vector, a third angle is formed between the first normal vector and the second normal vector, and the third angle falls in a range between 110 degrees and 130 degrees.

8. The backlight module according to claim 7, wherein the first surface has a third normal vector, a second angle is formed between the first normal vector and the third normal vector, a first angle is formed between the second normal vector and the third normal vector, and the first angle is substantially equal to the second angle.

9. The backlight module according to claim 4, wherein a boundary of the first column surface and the second column surface of each of the prism rods is a crest line extending along the first direction.

10. The backlight module according to claim 1, wherein the pitch of the prism rods along the second direction falls in a range between 30 micrometers and 150 micrometers.

* * * * *